United States Patent [19]
Thomassin

[11] 3,861,073
[45] Jan. 21, 1975

[54] FLEXIBLE FISHING LURE
[76] Inventor: Robert Charles Thomassin, 20, Rue Pasteur, Paris, France
[22] Filed: Feb. 25, 1974
[21] Appl. No.: 445,649

Related U.S. Application Data
[63] Continuation-in-part of Ser. No. 284,750, Aug. 30, 1972, abandoned.

[52] U.S. Cl. ............... 43/42.1, 43/42.24, 43/42.37, 43/42.39
[51] Int. Cl. .......................................... A01k 85/00
[58] Field of Search ............ 43/42.24, 42.02, 42.39, 43/42.47, 42.1, 42.37

[56] References Cited
UNITED STATES PATENTS
2,724,205  11/1955  Howard ........................ 43/42.02 X
3,349,513  10/1967  Jeff .................................. 43/42.02
3,490,165  1/1970   Thomassin .................... 43/42.24 X FOREIGN PATENTS OR APPLICATIONS
1,315,834  12/1962  France .............................. 43/42.24

Primary Examiner—Louis G. Mancene
Assistant Examiner—Daniel J. Leach
Attorney, Agent, or Firm—Spensley, Horn & Lubitz

[57] ABSTRACT

An artificial fishing lure for simulating the undulating movement of natural bait. The fishing lure is fabricated of a flexible material, a portion thereof being formed about a weighted member and the shank of a hook. A second portion of the flexible material depends rearwardly substantially circumscribing the hook, the depending portion being substantially in the form of a vertical membrane aligned along the shank of the hook. The depending membrane has its terminus directed toward the head of the fishing lure, the flexibility of the membrane causing the line to horizontally and vertically undulate when the fishing lure is being pulled through water.

6 Claims, 6 Drawing Figures

PATENTED JAN 21 1975 3,861,073
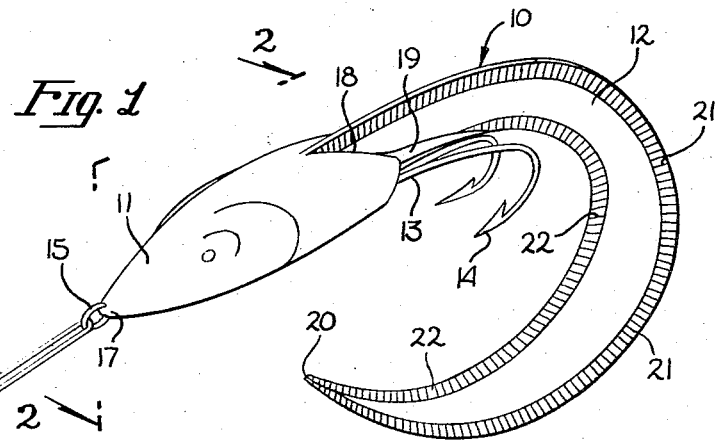
Fig. 1
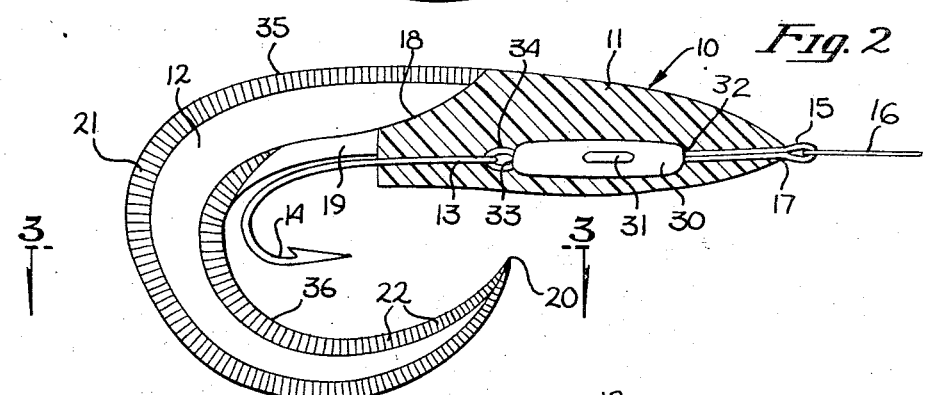
Fig. 2
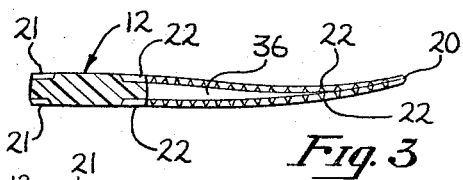
Fig. 3
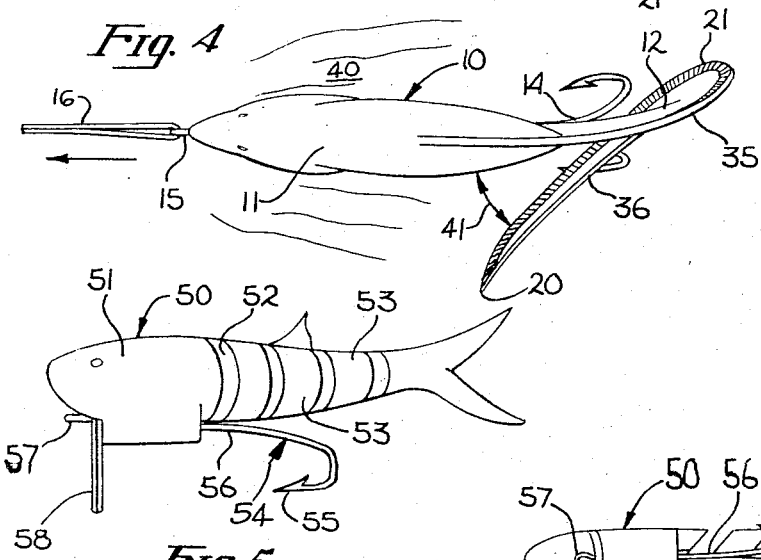
Fig. 4
Fig. 5
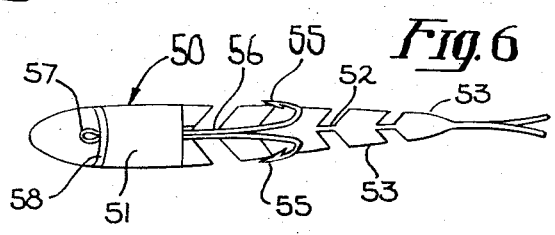
Fig. 6

FLEXIBLE FISHING LURE

This is a continuation-in-part of my application Ser. No. 284,750 filed Aug. 30, 1972, now abandoned.

BACKGROUND OF THE INVENTION

1. Field of the Invention

The present invention generally relates to artificial lures and, more specifically, to an artificial lure employing a membrane to enhance its undulating characteristics during use.

2. Prior Art

The prior art exhibits a vast number of structures for fishing lures, the structures generally being employed to simulate natural bait. U.S. letters Pat. Nos. 3,100,360 and 3,158,952 issued to M. M. Creme, illustrate precoiled artificial lures which are adapted to gyrate in a spiral path. The lures disclosed in both of the Creme patents typically comprise material molded in a coiled configuration. When being pulled through the water, the body of the lures uncoil and gyrate so as to be rotatable about an axis which is generally coextensive with the axis of a connecting rod to which the fishing line is attached. The problems inherent in this type of design are obvious. In the absence of a swiveling or pivoting member, the gryations of the lure will cause the fishing line to follow its movement and thereby become twisted and be more easily subject to breaking.

Another type of fishing lure is disclosed in U.S. letters Pat. No. 3,245,272 issued to Henry. The fishing lure disclosed in this patent utilizes a volute member having an opening through the center thereof which is threaded onto the leader of the lure adjacent the hook. The volute member is fabricated of a flexible material capable of convolving from the relatively planar condition of its quiescent state to a helical form under the action of water during trolling. One of the inherent defects in this device is its inability to simulate natural bait. The rotation of the volute member is intended to attract the attention of fish, but the only motion thereof is the revolving action of the volute member in reaction of movement through water.

The present invention seeks to overcome the basic inadequacies present in those devices disclosed in the prior art. The present invention utilizes a structure which is intended to portray the simulation of actual bait while providing motion which is consistent with the visual appearance of the lure.

SUMMARY OF THE INVENTION

The present invention comprises an artificial fishing lure which seeks to simulate the appearance and movement of a natural fish. The present invention utilizes a molded structure of flexible material, the structure comprising members for providing horizontal and vertical undulations in the lure as it is pulled through the water. A first member of flexible material is molded about a weighted element and the shank of a hook. The molded member about the weight and hook shank provides the visual appearance of a swimming fish. A second member depends rearwardly from the head portion of the artificial lure, the depending member being in the form of a thin membrane. The membrane is aligned along the vertical axis of the artificial lure. The planar surface of the membrane substantially circumscribes the hook. The membrane is tapered from the point at which it depends from the head portion of the artificial lure to which narrows at the point of the terminus thereof.

In its quiescent state, the membrane lies in a substantially flat plane along the axis of the head of the artificial lure. The top and bottom edges of the membrane are provided with parallel, spaced ridges which will increase the undulating movement of the membrane when the present invention lure is pulled through water. The thickness of the membrane typically decreases as the width of the membrane also decreases, the thickness and width of the membrane reaching an apex at the terminus thereof. The terminus of the membrane is pointed in substantially the direction the artificial lure is being pulled and therefore encounters the full resistance of the water while it is being pulled. The interaction of the ridges along the top and bottom surfaces of the membrane as well as the interaction the membrane terminus as it meets the water resistance will cause the membrane and the artificial lure to undulate both in the lateral and vertical directions thereby simulating the natural action of a small fish.

It is therefore an object of the present invention to provide an improved artificial fishing lure.

It is another object of the present invention to provide an artificial fishing lure which will simulate the lateral and vertical undulations of natural bait.

It is still another object of the present invention to provide a moldable, non-gyrating artificial lure.

It is still yet another object of the present invention to provide an artificial lure which is inexpensive and simple to fabricate.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

BRIEF DESCRIPTION OF THE DRAWING

FIG. 1 is a front perspective view of an embodiment of an artificial fishing lure in accordance with the present invention.

FIG. 2 is a side elevation, cross-sectional view of the artificial fishing lure shown in FIG. 1 taken through line 2—2 of FIG. 1.

FIG. 3 is a cross-sectional view of the membrane section of the artificial lure shown in FIG. 2 taken through line 3—3 of FIG. 2.

FIG. 4 is a top plan view of the artificial fishing lure shown in FIG. 1 in accordance with the present invention illustrating the movement thereof in water.

FIG. 5 is a side elevation view of an alternative embodiment of an artificial fishing lure in accordance with the present invention.

FIG. 6 is a bottom plan view of the artificial fishing lure shown in FIG. 5.

DESCRIPTION OF THE PRESENTLY PREFERRED EMBODIMENT

An understanding of a preferred embodiment of the present invention flexible fishing lure can be best gained by reference to FIG. 1 wherein a perspective view of the fishing lure is hown, the lure being generally designated by the reference numeral 10. The flexible fishing lure 10 is an artificial lure which is intended to simulate the appearance and movement of a swimming fish. Flexible fishing lure 10 comprises body section 11 and depending membrane section 12. Body section 11 of lure 10 generally simulates the head and body of the natural bait and, as will be explained in detail hereinbelow, encompasses an internal weight and shank 13 of hook 14. Depending from the front portion of body section 11 is leader coupling 15 which is adapted to be connected to the fishing line 16. Body section 11 is substantially cylindrical, one end thereof converging to an apex 17 at leader coupling 15. The end of body section 11 opposite apex 17 converges along interface 18 from which membrane section 12 depends. In order to provide for structural rigidity of membrane section 12 at interface 18, extension portions 19 of body section 11 extend along the lower edge of membrane section 12 for a distance which is approximately one-quarter the length of body section 11.

Membrane section 12 is a substantially planar member which is tapered from interface 18 to terminus 20 along the width and thickness thereof. Ridges 21 and 22 are disposed in parallel spaced relation to each other along the upper and lower edges respectively of membrane section 12. Although ridges 21 and 22 are shown along only a single surface of membrane section 12, it is understood that complementary sets of ridges 21 and 22 appear on each of the opposite surfaces of membrane section 12. Body section 11 and membrane section 12 of the present invention flexible fishing lure 10 are preferably molded from a flexible plastic material such as polyvinyl chloride although the scope of the present invention contemplates use of other suitable flexible materials.

Referring now to FIG. 2, a partial cross-sectional view of the present invention flexible lure 10 is shown. Body section 11 of the present invention flexible fishing lure 10 is preferably molded about weighted member 30 which is disposed at approximately the center of body section 11. Weighted member 30 is substantially cylindrical and typically includes a pair of projections 31 depending outwardly therefrom along the horizontal plane of lure 10, projections 31 stabilizing the position of weighted member 30 within body section 11. Weighted member 30 has first and second ends 32 and 33 respectively. Leader coupling 15 axially depends from weighted member 30 at first end 32, leader coupling 15 being aligned along the vertical axis of body section 11 and perpendicular to projections 31. Hook coupling 34 depends from second end 33 of weighted member 30. As in the case of leader coupling 15, hook coupling 34 is aligned along the vertical axis of body section 11 and perpendicular to projections 31. Shank 13 of hook 14 is secured to hook coupling 34, shank 13 being axially aligned with weighted member 30 and leader coupling 15. As can be seen in FIG. 2, a portion of shank 13 extends beyond the end of body section 11. As will be explained in detail hereinbelow, the curvature of hook 14 is substantially followed by the planar surface of membrane section 12.

Body section 11 is substantially cylindrical converging to apex 17 at leader coupling 15 and converging along parallel spaced interface edges 18 in the vicinity of shank 13. Membrane section 12 depends rearwardly from body section 11, membrane section 12 commencing along interface edge 18. Membrane section 12 is aligned with the vertical axis of body section 11 and therefore is parallel to leader coupling 15, and hook coupling 34, and is perpendicular to projections 31. Membrane section 12 is a substantially planar layer defined by converging edges 35 and 36. Interface 18 intermediate body section 11 and membrane section 12 extends substantially diagonally across the depending end of membrane section 12. To provide rigidity to a portion of membrane section 12 adjacent interface 18, the laterally thicker extension portions 19 of body section 11 continue adjacent interface 18 finally terminating at edge 36 approximately in the location where membrane 12 commences its curvature. In this manner, the portion of membrane section 12 adjacent body section 11 will maintain a much greater degree of rigidity than that which is present in the portion of membrane section 12 adjacent terminus 20. The effect of this construction will be explained in detail hereinbelow.

In order to closely simulate the fluttering movement of natural bait in water, ridges 21 and 22 are disposed along converging edges 35 and 36 respectively of membrane member 12. The ridges 21 and 22 are in parallel spaced relation with each other respectively. As the present invention lure 10 is towed through water by way of leader coupling 15, the interaction between ridges 21 and 22 and the water will cause a fluttering of membrane section 12 in a manner which will satisfy the objective of simulating movement of a swimming fish. The quiescent state of membrane 12 is that of a substantially planar surface. As can be seen in FIG. 2, the curvature of membrane 12 produces a substantially C-like configuration, terminus 20 of membrane 12 being directed toward apex 17 of body section 11.

As stated hereinabove, one of the objectives of the present invention is to produce an artificial fishing lure 10 which does not rotate about the leader but will produce the vertical and horizontal undulations typical of swimming fish. An understanding of the manner in which this is achieved in the embodiment of the present invention flexible fishing lure 10 can be best seen by reference to FIG. 2 and FIG. 3. FIG. 3 illustrates a cross-sectional view of a portion of membrane member 12 at a location substantially adjacent the terminus of portion 19. Membrane section 12 is tapered both along the dimension intermediate edges 35 and 36 as well as across the thickness thereof. The surfaces of membrane 12 converge upon one another at terminus 20, membrane 12 being structurally weaker at terminus 20 than it is adjacent interface 18. FIG. 3 illustrates the cavities created intermediate respective pairs of ridges 21 and 22. The interaction between ridges 21 and 22 and water when the present invention lure 10 is being pulled through the water creates the sensitive movements of membrane 12 in conformity with the objectives of the present invention.

Referring now to FIG. 4, the movement of the present invention flexible lure 10 through a water environment 40 is best seen. Lure 10 is being towed by fishing line 16 which is directly coupled to leader coupling 15. As stated hereinabove, an objective of the present invention is to provide an artificial lure which can be utilized without the spiral gyrations generally incident to those artificial lures disclosed in the prior art. Body section 11 of lure 10 is shown in top elevation, membrane section 12 rearwardly depending therefrom along interface 18. In order to simulate the movement of a swimming fish, the portion of membrane section 12 adjacent body section 11 at interface 18 must maintain a degree of stability, the movement of membrane section 12 increasing from interface 18 to terminus 20. FIG. 4 amply illustrates the overlapping presence of extension portion 19 of body section 11 which provides the increased mass necessary to prevent the adjacent portion of membrane section 12 from being unduly flexible.

When the present invention artificial flexible lure 10 is being towed through water 40, the position of membrane 12 in relationship to the direction of movement will cause a lateral or horizontal deflection 41 as indicated in FIG. 4. The portion of membrane section 12 adjacent terminus 20 is highly flexible since membrane section 12 is tapered from its interface 18 with body section 11 to terminus 20. The structurally weaker characteristic of membrane section 12 in the vicinity of terminus 20 will result in movement of membrane section 12 in a lateral vector such as that illustrated by the reference numeral 41. As was described in connection with FIG. 2, terminus 20 is directed toward apex 17 of body section 11 and will therefore be effected by the resistance of water 40 as lure 10 is being towed therethrough. The resistance imposed by water 40 at terminus 20 of membrane section 12 will tend to deflect terminus 20 of membrane section 12 rearwardly thereby producing vertical undulations of membrane section 12 and body section 11.

An alternative embodiment of an artificial fishing lure in accordance with the present invention is shown in FIG. 5 and FIG. 6, the lure being generally designated by the reference numeral 50. As stated hereinabove, an objective of the present invention is to produce a flexible fishing lure which will simulate the horizontal and vertical undulations of a swimming fish as opposed to the spiral gyrations of those artificial lures disclosed in the prior art. Fishing lure 50 comprises a body member 51 which has a substantially cylindrical shape. As can be best seen in FIG. 6, membrane 52 depends rearwardly from body member 51. In order to provide for the horizontal undulations necessary to implement the present invention, rearwardly directed projections 53 are projected outwardly from membrane 52, each set of the outwardly directed projections 53 being in substantially uniform spaced relation from each other. When the artificial lure 50 is towed through water, the force of water against projections 53 coupled with the flexibility of membrane 52 will result in the horizontal undulations which are sought.

As can be seen in FIG. 5, hook 54 comprises a barbed section 55 and a shanked end 56. Shank 56 is disposed within the lower portion of body section 51, leader coupling 57 being disposed at the front converging end of body section 51. Shank 56 is truncated in FIG. 6 to provide for better visability of membrane 52.

In order to provide the vertical undulations required by the present invention, a substantially concave, rigid member 58 depends downwardly from the bottom portion of body member 51, the forward surface 59 of rigid member 58 being substantially perpendicular to the intended movement of lure 50. As is best seen in FIG. 6, surface 59 is faced in the direction in which line 50 will move and therefore is slightly concave to provide for uniform tracking of lure 50 as it is being towed through the water. The force of the water against surface 59 of rigid member 58 will cause a substantial braking action causing body member 51 and dependent membrane 52 to undulate along the vertical axis of lure 50 thereby implementing the movement required of the present invention.

It can therefore be seen that the configuration of the membrane section and its cooperative relationship with the body section will produce an artificial lure which closely simulates the lateral and vertical undulations of the swimming fish without introducing the deleterious spiral gyrations normally incident to artificial lures. By providing a profile for membrane member 12 which closely follows that of hook 14 (FIG. 2), the hook will be substantially hidden from view thereby providing a more effective lure. The ability to mold flexible plastic such as polyvinyl cloride about a weighted member and the shank and leader couplings, the present invention flexible lure is simple and inexpensive to fabricate.

I claim:

1. An artificial fishing lure comprising:
   a. a flexible elongated member having a body section and a membrane section, said body section being substantially cylindrical and having first and second converging ends, said membrane section being a substantially planar, curved member depending rearwardly from said second converging end, the curvature of said membrane section defining an interior opening in the plane of said membrane section, the terminus of said membrane section being directed in the vicinity of the first converging end of said body section;
   b. weighted means for stabilizing the vertical and horizontal orientation of said elongated member, said weighted means being centrally disposed within said body section substantially along the axis thereof; and
   c. a hook having a shanked end and a barbed end, said shanked end being coupled to said weighted means and being partially disposed within said body section and aligned with said weighted means, said barbed end extending from said body section within the interior opening defined by said membrane section.

2. An artificial fishing lure as defined in claim 1, said membrane section having first and second side surfaces and first and second edges, said surfaces and edges being tapered to converge at a common point at the terminus of said membrane section.

3. An artificial fishing lure as defined in claim 2, said membrane section including a plurality of parallel, spaced ridges disposed in the side surfaces of said membrane section along the first and second edges thereof.

4. An artificial fishing lure as defined in claim 2, said body section including a pair of extension portions depending rearwardly from said second converging end, each of said extension portions being coextensive with a portion of said side surfaces at one of the edges of said membrane section.

5. An artificial fishing lure as defined in claim 1 wherein said weighted means comprises:
   a. a substantially cylindrical weighted member having a pair of diametrically opposed projections extending therefrom, said projections being oriented along the horizontal axis of said body section;
   b. leader coupling means for pulling said lure, said leader coupling means being axially aligned with and coupled to said weighted member and extending from the first converging end of said body section; and c. a hook coupling depending from said weighted member pependicular to said projections and being adapted to be coupled to the shanked end of said hook.

6. An artificial fishing lure as defined in claim 5 wherein said leader coupling means comprises a shaft coupled to said weighted and extending from said first converging end, and an eyelet coupled to said shaft, said eyelet being perpendicular to said projections whereby said eyelet is aligned with the vertical axis of said body section.

* * * * *